(12) United States Patent
Chen (10) Patent No.: US 12,430,075 B2
(45) Date of Patent: Sep. 30, 2025

(54) ELECTRONIC DEVICE AND OPERATION METHOD THEREOF

(71) Applicant: Sigmastar Technology Ltd., Xiamen (CN)

(72) Inventor: Zeng-Peng Chen, Xiamen (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 153 days.

(21) Appl. No.: 18/237,598

(22) Filed: Aug. 24, 2023

(65) Prior Publication Data

US 2024/0118834 A1    Apr. 11, 2024

(30) Foreign Application Priority Data

Oct. 11, 2022   (CN) .......................... 202211242302.0

(51) Int. Cl.
*G06F 3/06*    (2006.01)
(52) U.S. Cl.
CPC .......... *G06F 3/0659* (2013.01); *G06F 3/0604* (2013.01); *G06F 3/064* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 2003/0159025 A1* | 8/2003 | Dubal | ................... | G06F 9/4401 713/1 |
| 2014/0122796 A1* | 5/2014 | DeKoning | .............. | G06F 3/064 711/E12.019 |
| 2019/0188127 A1 | 6/2019 | Lee | | |
| 2019/0260388 A1* | 8/2019 | Wegener | ................ | G06F 3/0673 |
| 2023/0333858 A1* | 10/2023 | Govindarajan | ..... | G06F 12/1483 |

FOREIGN PATENT DOCUMENTS

| | | |
|---|---|---|
| CN | 110324632 A | 10/2019 |
| TW | 201928686 A | 7/2019 |

OTHER PUBLICATIONS

1) OA letter of a counterpart TW application (appl. No. 111139317) mailed on Jul. 12, 2023. 2) Summary of the TW OA letter: Claim(s) 1-6, 8-9, 10-15 and 17-20 is/are rejected under Patent Law Article 22(2) as allegedly being unpatentable over reference 1 (TW201928686A) and reference 2 (CN110324632A).

* cited by examiner

*Primary Examiner* — Prasith Thammavong
*Assistant Examiner* — Edmund H Kwong
(74) *Attorney, Agent, or Firm* — WPAT, PC (57) ABSTRACT

An electronic device includes a first and second decoding circuits and is coupled to a storage device and a memory, and the storage device stores compressed data. An operation method of the electronic device includes the following steps: performing a first read operation to read a first sub-block from a first read address of the storage device; performing a first write operation to write the first sub-block to a first write address of the memory; performing a second read operation to read a second sub-block from a second read address of the storage device; performing a second write operation to write the second sub-block to a second write address of the memory; reading via the first decoding circuit the first sub-block from the memory and decoding via the first decoding circuit the first sub-block; and reading via the second decoding circuit the second sub-block from the memory and decoding via the second decoding circuit the second sub-block.

18 Claims, 8 Drawing Sheets

| pre-identifier FID | number of blocks NB | sub-block size SSB |
| | size of the first block after decompression SUB1 | |
| size of the first block SCB1 | size of the second block after decompression SUB2 | |
| size of the second block SCB2 | size of the third block after decompression SUB3 | |
| size of the third block SCB3 | ... | |
| padding value PD | | |
| compressed data | | |
| post-identifier RID | | |

HDR / FTR

ELECTRONIC DEVICE AND OPERATION METHOD THEREOF

This application claims the benefit of China application Serial No. CN202211242302.0, filed on Oct. 11, 2022, the subject matter of which is incorporated herein by reference.

BACKGROUND OF THE INVENTION

1. Field of the Invention

The present invention generally relates to electronic devices, and, more particularly, to the decompression operation of electronic devices.

2. Description of Related Art

Figure 1:
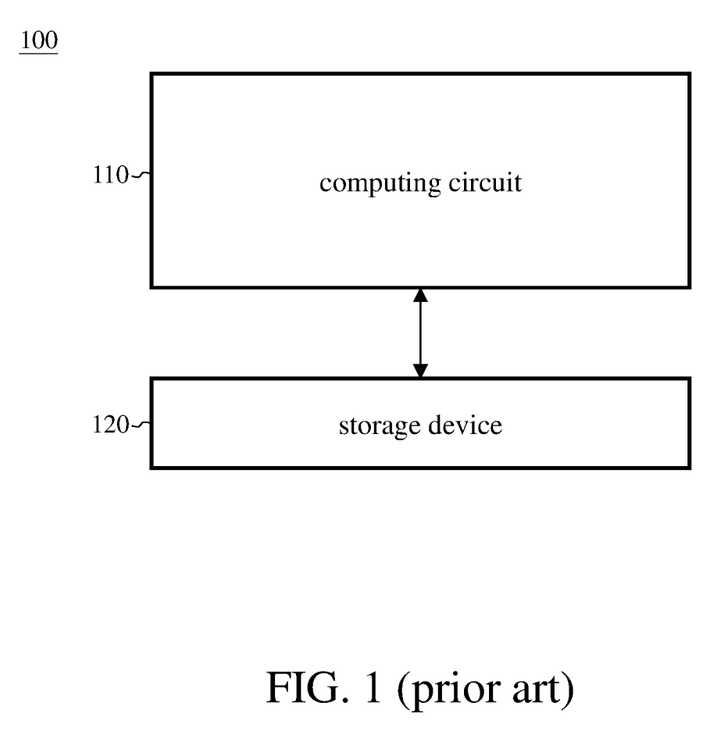
FIG. 1 shows a prior-art electronic device.

FIG. 1 shows a conventional electronic device 100. The electronic device 100 includes a computing circuit 110 and a storage device 120. The storage device 120 stores compressed files (e.g., compressed codes or compressed program instructions). The computing circuit 110 must decompress the files before executing the program codes or program instructions. As a result, the performance of the electronic device 100 is subject to the decompression efficiency of the computing circuit 110.

In some cases, the compressed files stored in the storage device 120 are boot image files. In the booting process of the electronic device 100, the computing circuit 110 reads the compressed files from the storage device 120, decompresses the compressed files, and then executes the boot codes. Therefore, a poor decompression efficiency of the computing circuit 110 leads to slow booting of the electronic device 100, which degrades the user experience.

SUMMARY OF THE INVENTION

In view of the issues of the prior art, an object of the present invention is to provide an electronic device and an operation method thereof, so as to make an improvement to the prior art.

According to one aspect of the present invention, an electronic device is provided. The electronic device is coupled to a storage device and a memory. The storage device stores a compressed data. The electronic device includes a memory interface circuit, a decompression module, and a computing circuit. The memory interface circuit is coupled to the memory. The decompression module includes a first decoding circuit and a second decoding circuit. The decompression module or the computing circuit performs the following steps: (A) performing a first read operation to read a first sub-block from a first read address of the storage device; (B) performing a first write operation to write the first sub-block to a first write address of the memory through the memory interface circuit; (C) performing a second read operation to read a second sub-block from a second read address of the storage device, the second read address being equal to the first read address plus an amount of data of the first sub-block; and (D) performing a second write operation to write the second sub-block to a second write address of the memory through the memory interface circuit. The decompression module performs the following steps: (E) reading, via the first decoding circuit, the first sub-block from the memory and decoding, via the first decoding circuit, the first sub-block; and (F) reading, via the second decoding circuit, the second sub-block from the memory and decoding, via the second decoding circuit, the second sub-block.

According to another aspect of the present invention, an operation method of an electronic device is provided. The electronic device includes a first decoding circuit and a second decoding circuit. The electronic device is coupled to a storage device and a memory, and the storage device stores a compressed data. The method includes the following steps: performing a first read operation to read a first sub-block from a first read address of the storage device; performing a first write operation to write the first sub-block to a first write address of the memory; performing a second read operation to read a second sub-block from a second read address of the storage device, the second read address being equal to the first read address plus an amount of data of the first sub-block; performing a second write operation to write the second sub-block to a second write address of the memory; reading, via the first decoding circuit, the first sub-block from the memory and decoding, via the first decoding circuit, the first sub-block; and reading, via the second decoding circuit, the second sub-block from the memory and decoding, via the second decoding circuit, the second sub-block.

According to still another aspect of the present invention, an electronic device is provided. The electronic device is coupled to a storage device and a memory. The storage device stores a compressed data. The electronic device includes a memory interface circuit, a decompression module, and a computing circuit. The memory interface circuit is coupled to the memory. The decompression module includes a first decoding circuit and a second decoding circuit. The decompression module or the computing circuit performs the following steps: reading a first sub-block of the compressed data from the storage device; writing the first sub-block to a first storage space of the memory through the memory interface circuit; reading a second sub-block of the compressed data from the storage device, the second sub-block immediately following the first sub-block in the storage device; and writing the second sub-block to a second storage space of the memory through the memory interface circuit, the second storage space being different from the first storage space. The decompression module performs the following steps: reading, via the first decoding circuit, the first sub-block from the first storage space and decoding, via the first decoding circuit, the first sub-block; and reading, via the second decoding circuit, the second sub-block from the second storage space and decoding, via the second decoding circuit, the second sub-block.

The technical means embodied in the embodiments of the present invention can solve at least one of the problems of the prior art. Therefore, the present invention can improve the program execution performance and/or boot speed of the electronic device compared with the prior art.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes an electronic device and an operation method thereof. On account of that some or all elements of the electronic device could be known, the detail of such elements is omitted provided that such detail has little to do with the features of this disclosure, and that this omission nowhere dissatisfies the specification and enablement requirements. Some or all of the processes of the operation method may be implemented by software and/or firmware and can be performed by the electronic device or its equivalent. A person having ordinary skill in the art can choose components or steps equivalent to those described in this specification to carry out the present invention, which means that the scope of this invention is not limited to the embodiments in the specification.

Figure 2:
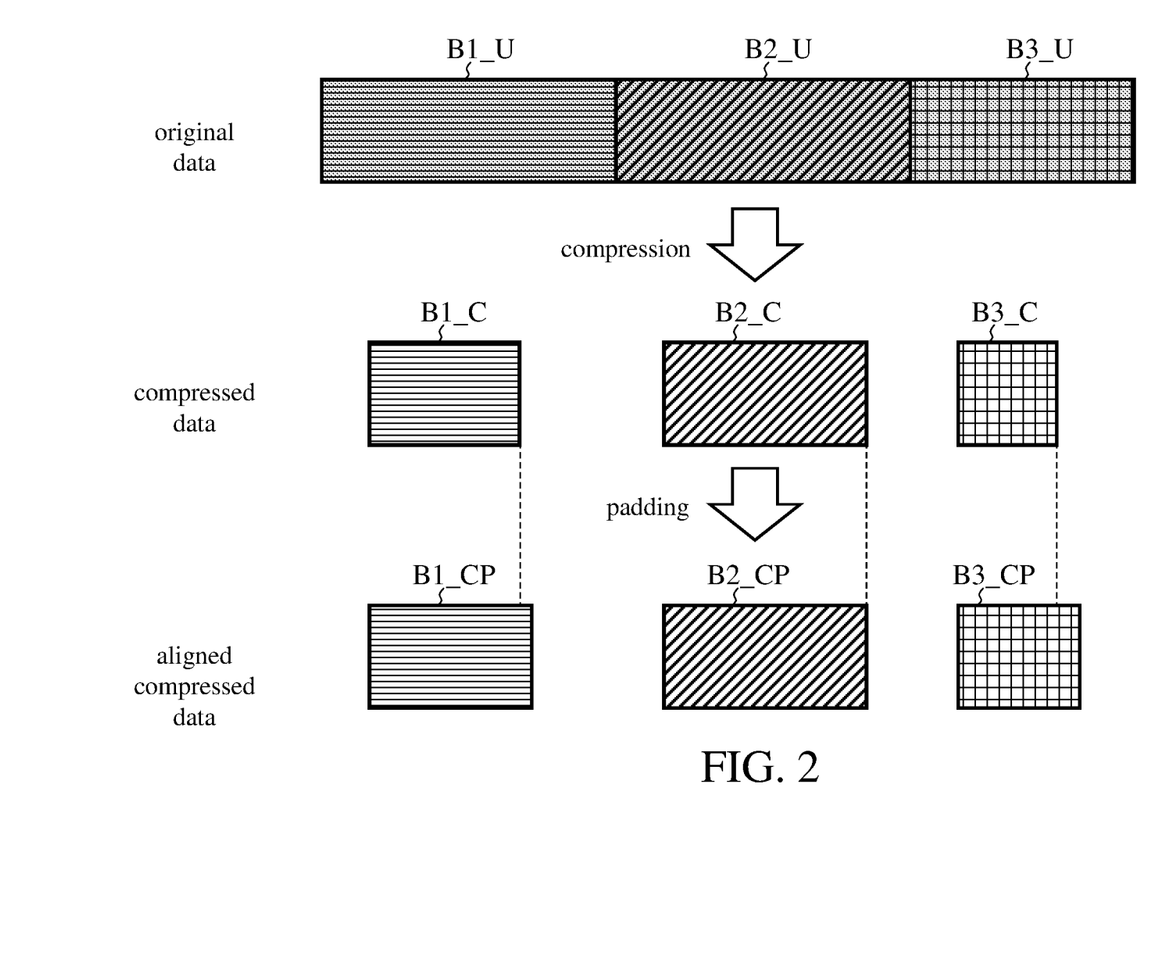
FIG. 2 is a schematic diagram of the original data, compressed data, and aligned compressed data according to an embodiment of the present invention.

FIG. 2 is a schematic diagram of the original data (i.e., the data before compression), compressed data, and aligned compressed data according to an embodiment of the present invention. The first row is the original data (i.e., including the block B1_U, the block B2_U, and the block B3_U), the second row is the compressed data (i.e., the compressed original data, including the block B1_C, the block B2_C, and the block B3_C, corresponding respectively to the block B1_U, the block B2_U, and the block B3_U), and the third row is the aligned compressed data (i.e., the compressed data subjected to the data alignment operation, where the aligned compressed data include the block B1_CP, the block B2_CP, and the block B3_CP, corresponding respectively to the block B1_C, the block B2_C, and the block B3_C). The data alignment operation, which can be realized by the padding technique, is to make the compressed data an integer multiple of unit length (e.g., nx32 bytes, where n is an integer). In some cases where the compressed data is exactly an integer multiple of the unit length, no padding is required (i.e., the padding size is 0), such as the block B2_C.

The "compressed data" referred to in the following discussion is the aligned compressed data.

Figure 3:
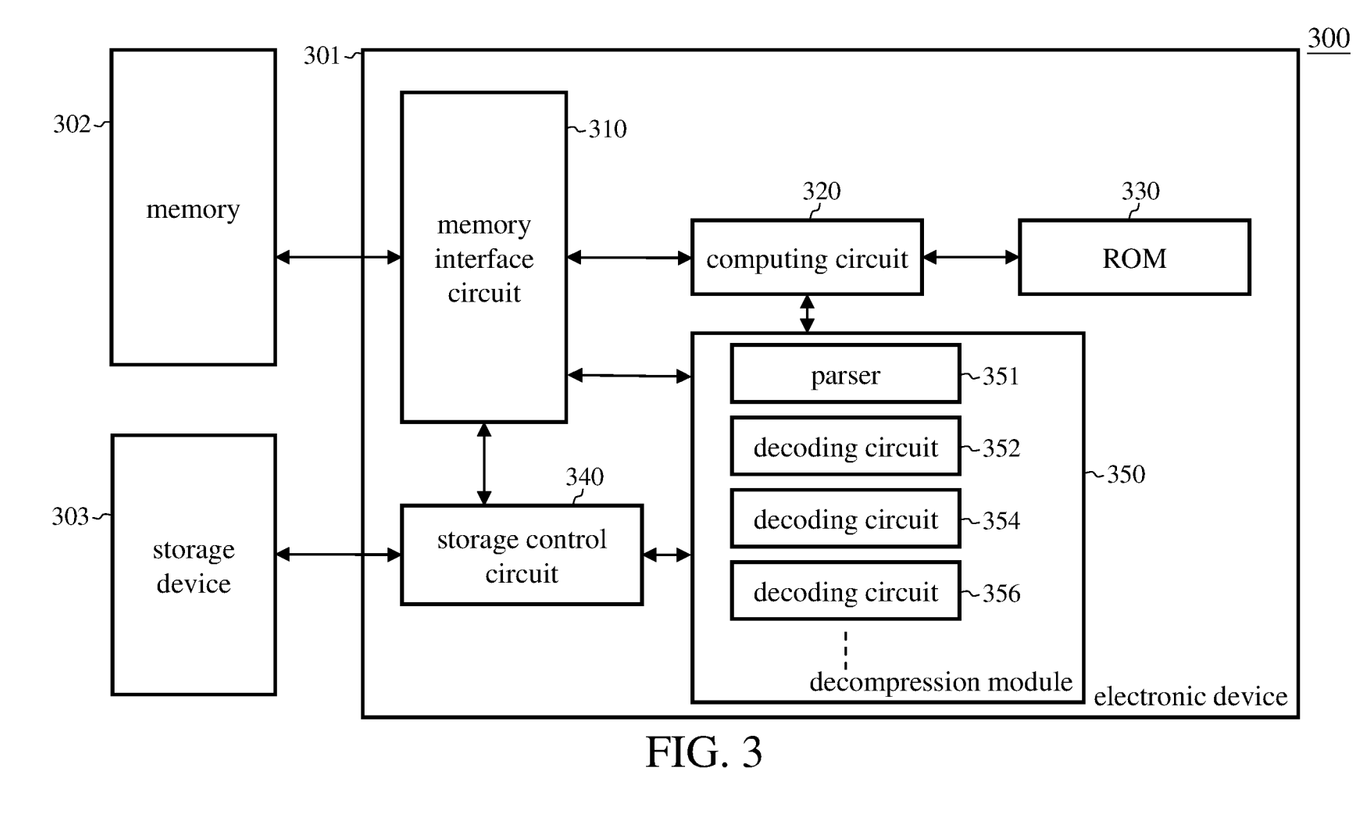
FIG. 3 is a functional block diagram of an embedded system according to an embodiment of the present invention.

FIG. 3 is a functional block diagram of an embedded system according to an embodiment of the present invention. The embedded system 300 includes an electronic device 301, a memory 302, and a storage device 303. The electronic device 301 is coupled to the memory 302 and the storage device 303, and includes a memory interface circuit 310, a computing circuit 320, a read-only memory (ROM) 330, a storage control circuit 340, and a decompression module 350.

In some embodiments, the electronic device 301 is a chip, the memory 302 is a dynamic random access memory (DRAM), and the storage device 303 is a flash memory, embedded multimedia card (eMMC), or secure digital (SD) memory card.

In some embodiments, the computing circuit 320 may be a circuit or an electronic component capable of executing programs, such as a central processing unit (CPU), a microprocessor, a micro-processing unit, a digital signal processor (DSP), or an Application Specific Integrated Circuit (ASIC), or an equivalent thereof. The computing circuit 320 implements the functions of the electronic device 301 by executing program codes and/or program instructions.

The memory interface circuit 310 is coupled to the memory 302, and the electronic device 301 accesses the memory 302 through the memory interface circuit 310. The storage control circuit 340 is configured to access the storage device 303 and to write data to the memory 302 through the memory interface circuit 310. The decompression module 350 is coupled to the memory interface circuit 310, the computing circuit 320, and the storage control circuit 340, and is configured to decompress the compressed data. The computing circuit 320 is coupled to the ROM 330 and configured to execute the ROM boot codes in the ROM 330. ROM boot is well known to people having ordinary skill in the art, and the details are omitted for brevity.

The decompression module 350 includes a decoding circuit 352, a decoding circuit 354, and a decoding circuit 356, which are configured to decode the block B1_CP, the block B2_CP, and the block B3_CP in FIG. 2, respectively. The decompression module 350 further includes a parser 351. The operational details of the decompression module 350 will be discussed below in reference to FIGS. 6-8. The parser 351 can be embodied by a logic circuit, such as a finite state machine (FSM).

The decoding circuit 352, the decoding circuit 354, and the decoding circuit 356 can perform decoding operations simultaneously to reduce the overall decompression time. Ideally, the decoding circuit 352, the decoding circuit 354, and the decoding circuit 356 start decoding at substantially the same time and finish decoding at substantially the same time to improve decompression efficiency (i.e., to reduce the overall decompression time required). However, when the original data is evenly divided (i.e., the block B1_U, block B2_U, and block B3_U are of the same size), the compression rates of the blocks are different due to the lack of regularity in the content of the original data. As a result, the decoding circuit 352, the decoding circuit 354, and the decoding circuit 356 cannot start decoding at substantially the same time and finish decoding at substantially the same time (e.g., the decoding circuits finish decoding at quite different times). This degrades the performance of the electronic device 301 because the computing circuit 320 has to wait for all the decoding circuits of the decompression module 350 to finish decoding. Therefore, the present invention provides a data segmentation method to improve decompression efficiency.

In the following discussions, it is assumed that the decompression module 350 includes three decoding circuits. However, in other embodiments, the decompression module 350 may include two, four, or more decoding circuits.

Figure 4:
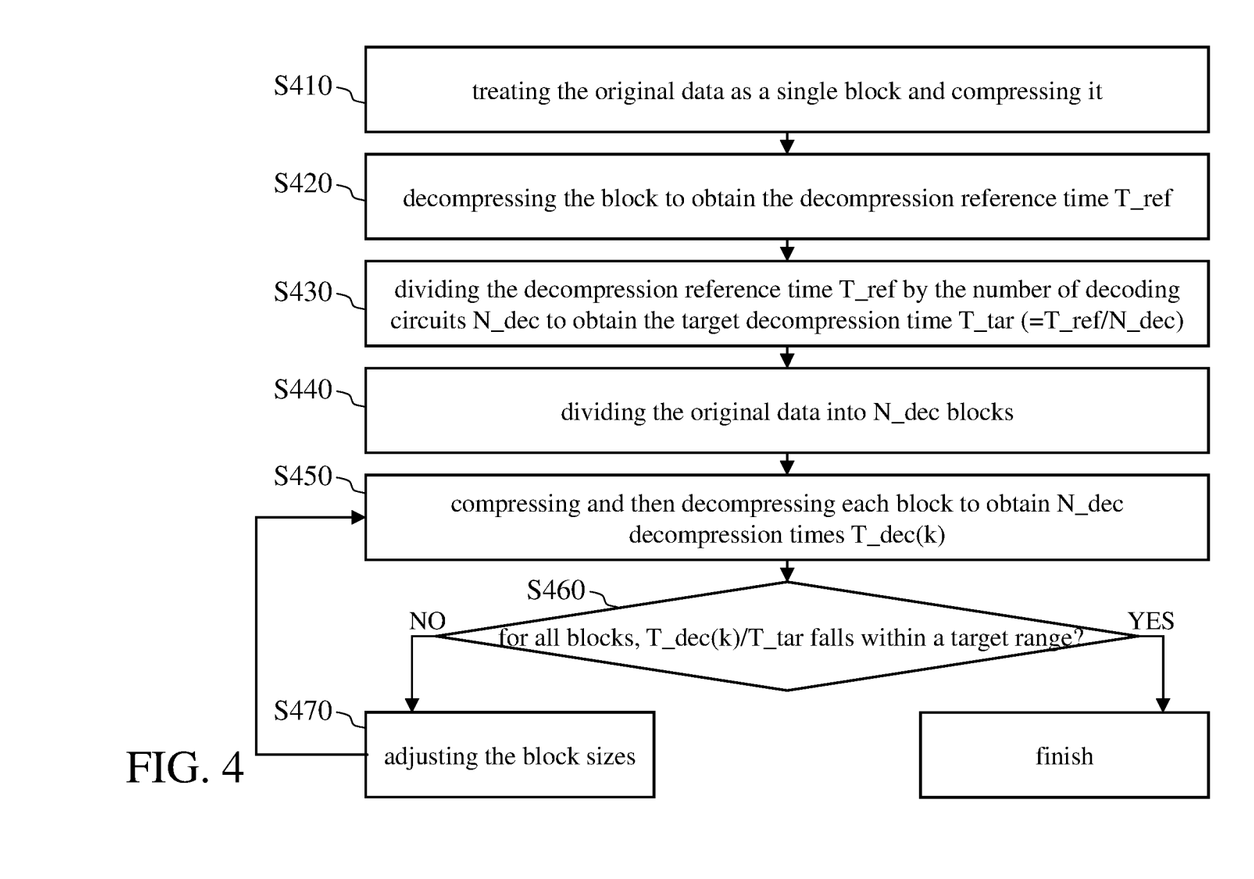
FIG. 4 is a flowchart of data segmentation method according to an embodiment of the present invention.

FIG. 4 is a flowchart of the data segmentation method according to an embodiment of the present invention. The flowchart includes the following steps.

Step S410: Treating the original data as a single block and compressing it, that is, compressing the original data into a single block.

Step S420: Decompressing the block to obtain the decompression reference time T_ref.

Step S430: Dividing the decompression reference time T_ref by the number of decoding circuits N_dec (e.g., 3) to obtain the target decompression time T_tar (=T_ref/N_dec).

Step S440: Dividing the original data into N_dec blocks (e.g., as shown in FIG. 2).

Step S450: Compressing and then decompressing each block to obtain N_dec decompression times T_dec(k) (k=1, 2, . . . , N_dec).

Step S460: For each of the N_dec blocks, determining whether the ratio of the decompression time to the target decompression time (T_dec(k)/T_tar) falls within a target range. For example, Lth<T_dec(k)/T_tar<Uth (for all k) (where the lower bound Lth and upper bound Uth are rational numbers). If YES, the data segmentation process finishes, meaning that the block size determined in step S440 can ensure that all decoding circuits of the decompression module 350 complete decoding at substantially the same time or within the target time interval; if NO, the flow proceeds to step S470.

Step S470: Adjusting the block sizes. For example, if the decompression time T_dec(1) of the first block is too large (i.e., T_dec(k)/T_tar>Uth) or too small (i.e., T_dec(k)/T_tar<Lth), the amount of data in the first block is decreased or increased.

In some embodiments, the developer or manufacturer of the electronic device 301 can control the decompression time of the decompression module 350 in actual operation by adjusting the target range (i.e., adjusting the lower bound Lth and/or the upper bound Uth). For example, if the decoding circuit 352, the decoding circuit 354, and the decoding circuit 356 require the times Tp_dec(1), Tp_dec(2), and Tp_dec(3) respectively for decompression in actual operation, then the three decompression times Tp_dec(1), Tp_dec(2), and Tp_dec(3) can be controlled to be similar by adjusting the target range, so that the ratio between any two decompression times is substantially less than or equal to 1.2 (the first embodiment) or 1.05 (the second embodiment). The decompression efficiency of the decompression module 350 can be ensured in the first embodiment, while the decompression efficiency of the decompression module 350 is further improved (i.e., the electronic device 301 performs better) in the second embodiment.

Reference is made to both FIG. 2 and FIG. 3. As discussed above, the present invention divides the original data into multiple blocks (e.g., the block B1_U, the block B2_U, and the block B3_U) in advance and then generates a compressed block of each block (e.g., the block B1_CP, the block B2_CP, and the block B3_CP). When the electronic device 301 operates, multiple decoding circuits (e.g., the decoding circuit 352, the decoding circuit 354, and the decoding circuit 356) of the decompression module 350 simultaneously decode the compressed blocks to improve the decompression efficiency. To achieve this purpose (simultaneous decoding of the compressed blocks by multiple decoding circuits of the decompression module 350), each compressed block is further divided into multiple sub-blocks and the sub-blocks are stored in the storage device 303 according to a preset arrangement. The details are discussed below in connection with FIGS. 5-7.

Figure 5:
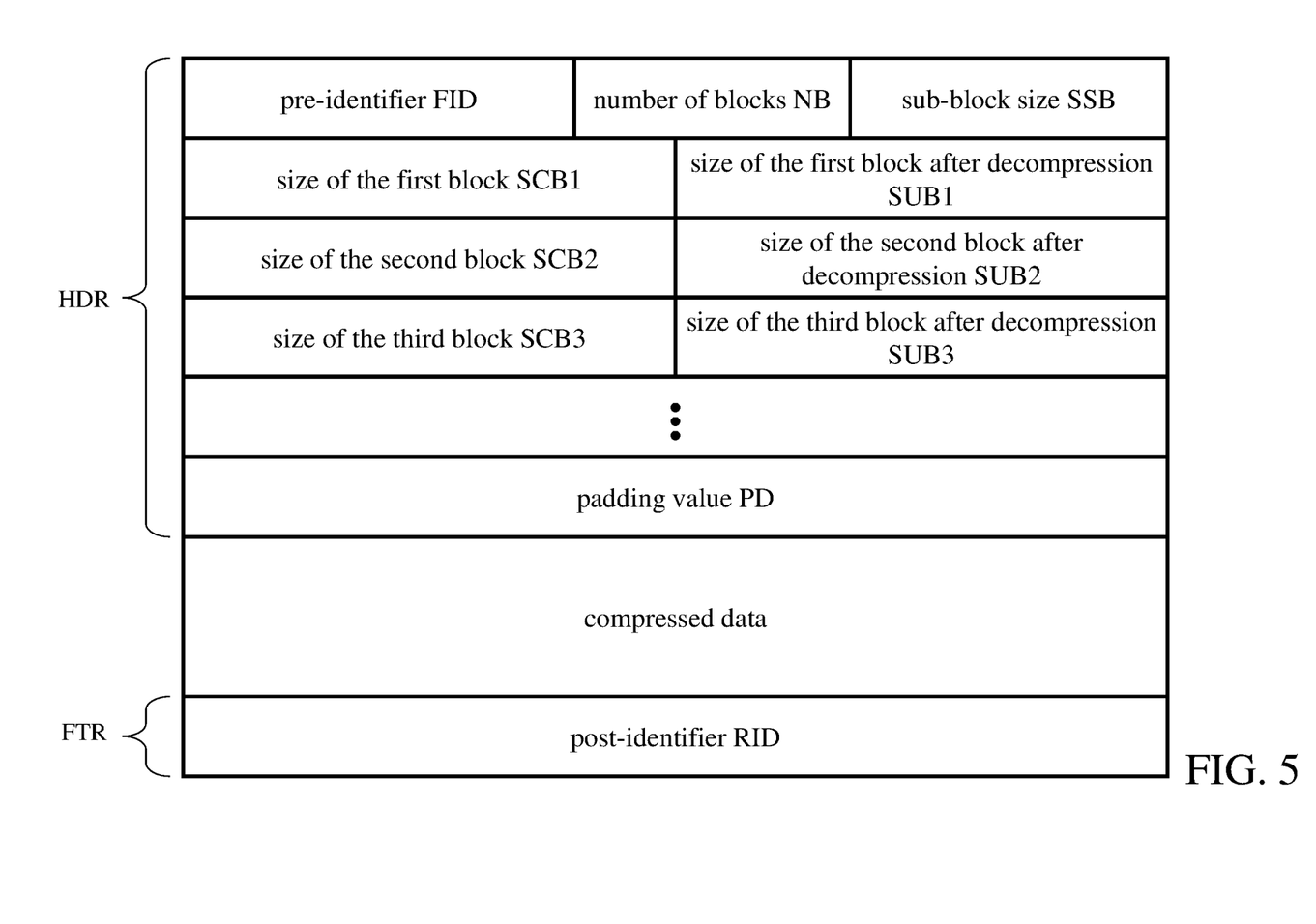
FIG. 5 is a schematic diagram of an information file of the compressed data according to an embodiment of the present invention.

FIG. 5 is a schematic diagram of an information file of the compressed data according to an embodiment of the present invention. The compressed data is arranged between the header HDR and the footer FTR. The header HDR and the footer FTR are collectively referred to as the information file of the compressed data. The compressed data and its information file are stored in the storage device 303. The header HDR includes the pre-identifier FID, the number of blocks NB (in the example of FIG. 2, NB=3, which are the block B1_CP, the block B2_CP, and the block B3_CP), the sub-block size (i.e., the amount of data of a sub-block) SSB, the size of the first block SCB1 (i.e., the size of the block B1_CP), the size of the first block after decompression SUB1 (i.e., the size of the block B1_U), the size of the second block SCB2 (i.e., the size of the block B2_CP), the size of the second block after decompression SUB2 (i.e., the size of the block B2_U), the size of the third block SCB3 (i.e., the size of the block B3_CP), the size of the third block after decompression SUB3 (i.e., the size of the block B3_U), and the padding value PD. The footer FTR includes the post-identifier RID. The electronic device 301 can find the compressed data in the storage device 303 according to the pre-identifier FID, the number of blocks NB, and the post-identifier RID.

The electronic device 301 can obtain the number of sub-blocks NSB1 (=SCB1/SSB) of the block B1_CP, the number of sub-blocks NSB2 (=SCB2/SSB) of the block B2_CP, and the number of sub-blocks NSB3 (=SCB3/SSB) of the block B3_CP according to the header HDR.

Figure 6:
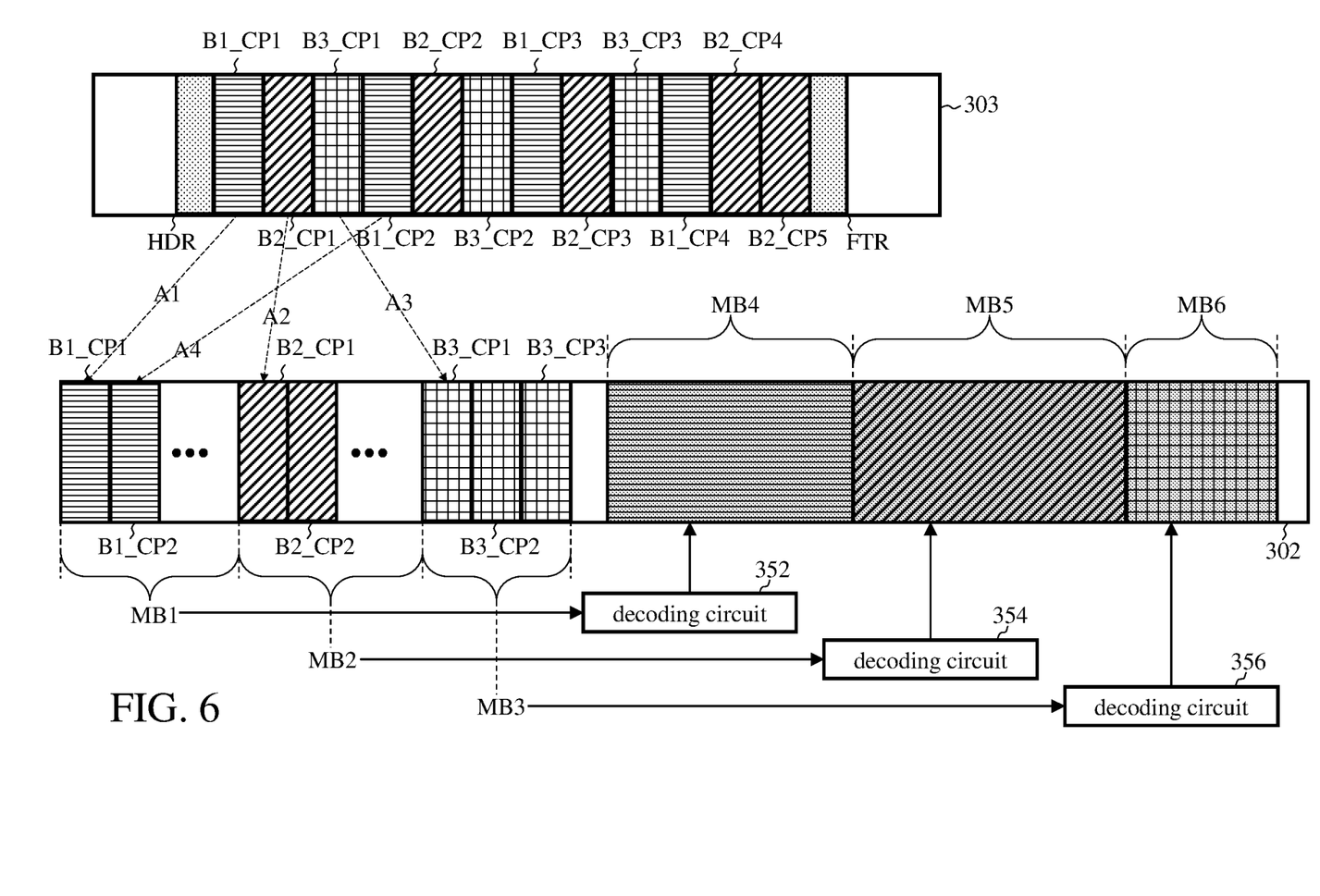
FIG. 6 shows a schematic diagram of data arrangement in the memory and storage device according to an embodiment.
Figure 7:
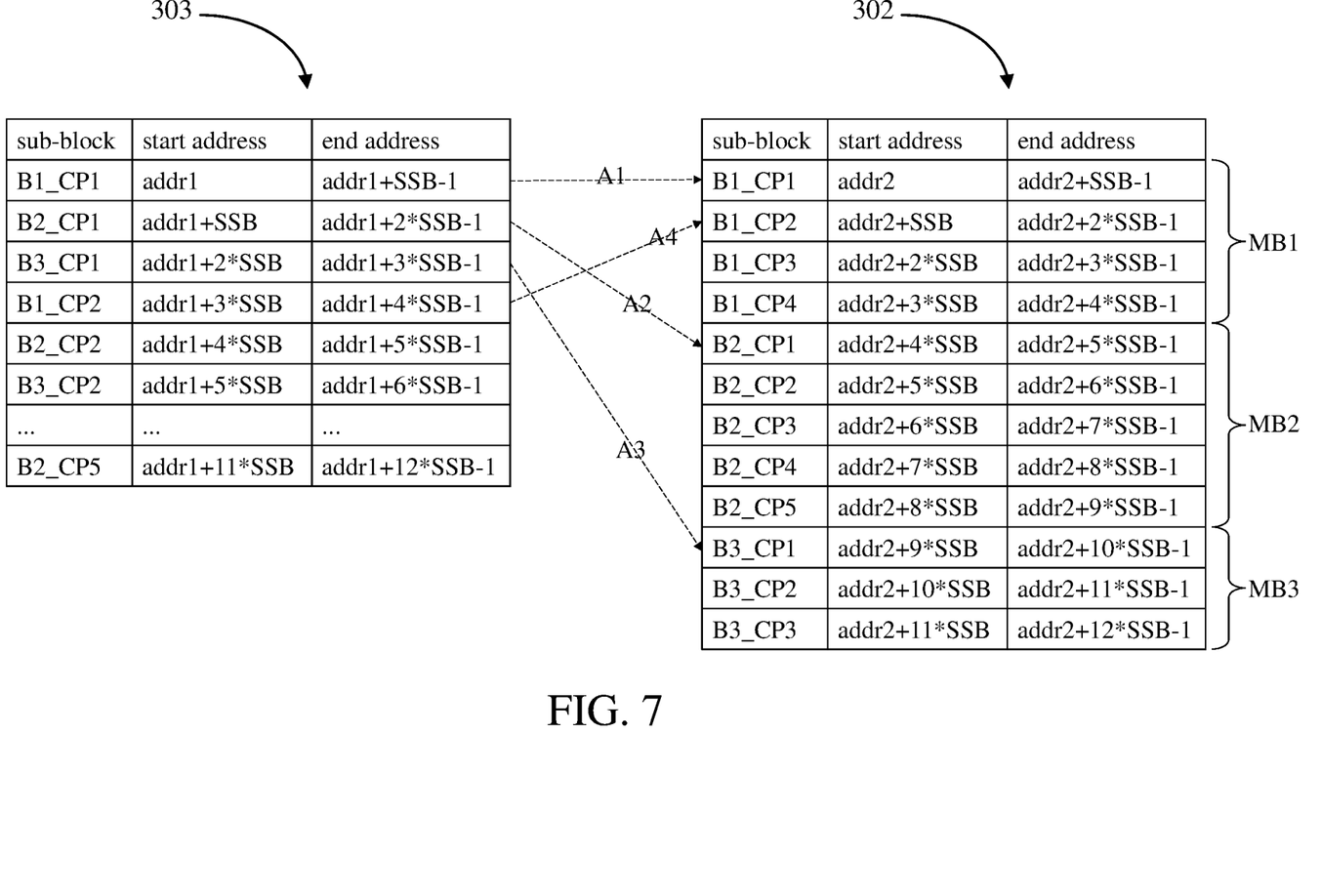
FIG. 7 shows a schematic diagram of the start address and end address of each sub-block in the memory and the storage device according to an embodiment.

FIG. 6 shows a schematic diagram of data arrangement in the memory 302 and the storage device 303 according to an embodiment, and FIG. 7 shows a schematic diagram of the start address and end address of each sub-block in the memory 302 and the storage device 303 according to an embodiment.

The first row of FIG. 6 shows the arrangement of the compressed data in the storage device 303, and the second row of FIG. 6 shows the arrangement of the compressed data and the decompressed data in the memory 302.

The table on the left side of FIG. 7 shows the start address and end address of each sub-block in the storage device 303, and the table on the right side of FIG. 7 shows the start address and end address of each sub-block in the memory 302. "addr1" and "addr2" are reference addresses in the storage device 303 and the memory 302, respectively. In some embodiments, the reference address addr1 and the reference address addr2 can be determined in advance by the developer or manufacturer of the embedded system 300.

Reference is made to FIG. 2, FIG. 6, and FIG. 7. In the example of FIG. 2, FIG. 6, and FIG. 7, the block B1_CP includes four sub-blocks (which are the sub-block B1_CP1, the sub-block B1_CP2, the sub-block B1_CP3, and the sub-block B1_CP4; that is, the number of sub-blocks NSB1 is 4), the block B2_CP includes five sub-blocks (which are the sub-block B2_CP1, the sub-block B2_CP2, the sub-block B2_CP3, the sub-block B2_CP4, and the sub-block B2_CP5; that is, the number of sub-blocks NSB2 is 5), and the block B3_CP includes three sub-blocks (which are the sub-block B3_CP1, the sub-block B3_CP2, and the sub-block B3_CP3; that is, the number of sub-blocks NSB3 is 3).

Reference is made to FIG. 6 and FIG. 7. In the storage device 303, the sub-blocks of the block B1_CP, the block B2_CP, and the block B3_CP are arranged in the following order (from the header HDR to the footer FTR): the sub-block B1_CP1 of the block B1_CP, the sub-block B2_CP1 of the block B2_CP, the sub-block B3_CP1 of the block B3_CP, the sub-block B1_CP2 of the block B1_CP, the sub-block B2_CP2 of the block B2_CP, the sub-block B3_CP2 of the block B3_CP, and continues in this order.

Reference is made to FIG. 6 and FIG. 7. In the memory 302, sub-blocks of the same block are arranged together. For example, the sub-blocks of the block B1_CP are arranged in the storage space MB1, the sub-blocks of the block B2_CP are arranged in the storage space MB2, and the sub-blocks of the block B3_CP are arranged in the storage space MB3.

Reference is made to FIG. 6 and FIG. 7. In the storage device 303, the sub-block B1_CP1 and the sub-block B2_CP1 are next to each other (i.e., arranged consecutively, that is, the sub-block B2_CP1 immediately follows the sub-block B1_CP1); however, in the memory 302, the sub-block B1_CP1 and the sub-block B2_CP1 are not next to each other. In the storage device 303, the sub-block B1_CP1 and the sub-block B1_CP2 are not next to each other; however, in the memory 302, the sub-block B1_CP1 and the sub-block B1_CP2 are next to each other.

The decompression module 350 (more specifically, the parser 351) or the computing circuit 320 controls the storage control circuit 340 (e.g., by changing the register value of the register) to sequentially read the sub-blocks from the storage device 303, and, according to the header HDR, the storage control circuit 340 is controlled to write the sub-blocks to the corresponding storage space in the memory 302. The decoding circuit 352, the decoding circuit 354, and the decoding circuit 356 read the sub-blocks of their corresponding blocks from the storage space MB1, the storage space MB2, and the storage space MB3, respectively, through the memory interface circuit 310, decode the sub-blocks, and store the decoded data in the storage space MB4, the storage space MB5, and the storage space MB6 of the memory 302, respectively, through the memory interface circuit 310. In other words, the block B1_U is arranged in the storage space MB4, the block B2_U is arranged in the storage space MB5, and the block B3_U is arranged in the storage space MB6. The data in the storage space MB4, the data in the storage space MB5, and the data in the storage space MB6 collectively form the original data.

Figure 8:
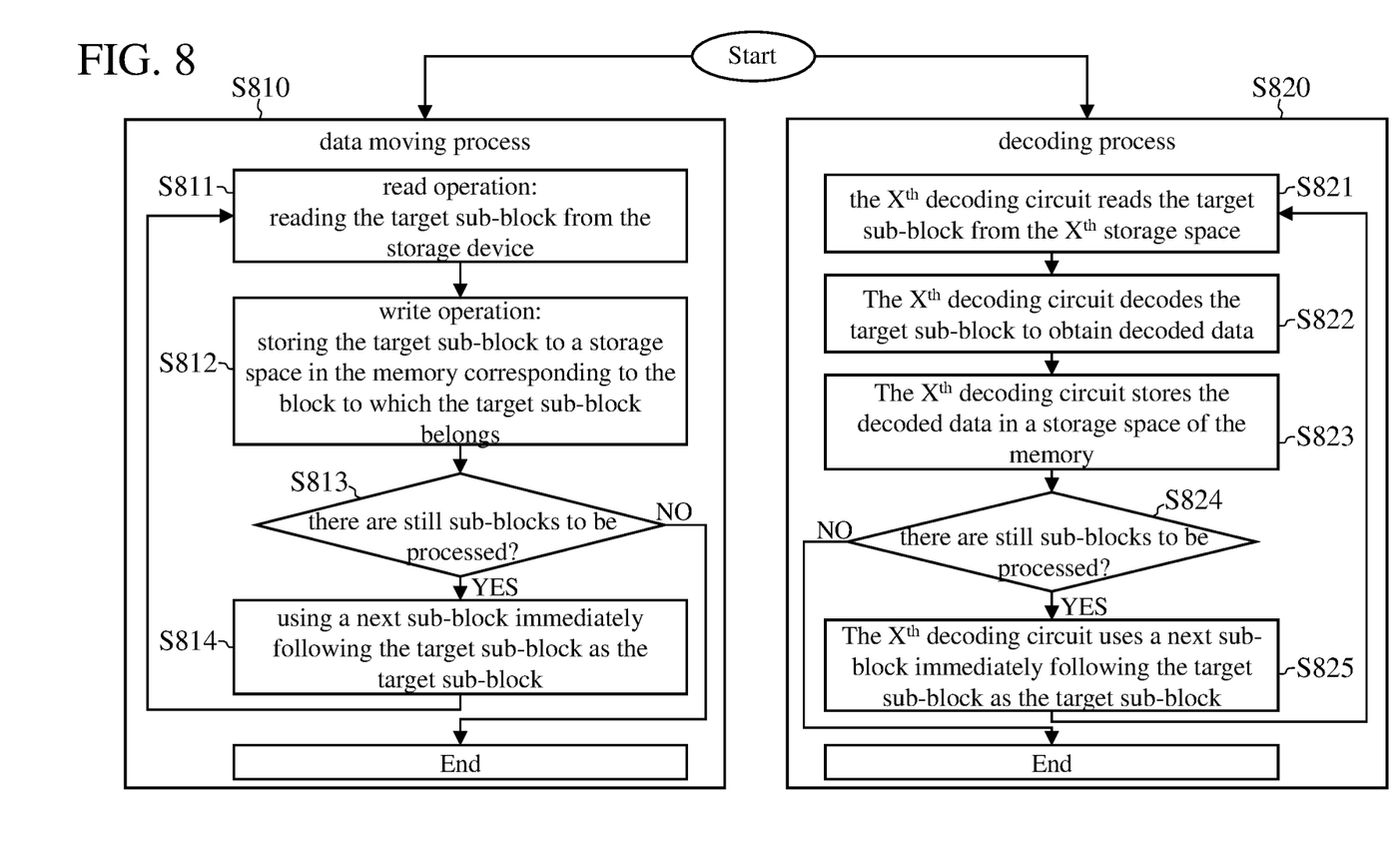
FIG. 8 is a flowchart of an operation method of an electronic device according to an embodiment of the present invention.

FIG. 8 is a flowchart of an operation method of the electronic device according to an embodiment of the present invention. The flow includes a data moving process S810 and a decoding process S820. The data moving process S810 is executed by the parser 351 (by controlling the storage control circuit 340), and the decoding process S820 is executed by the decompression module 350. More specifically, while the parser 351 is executing the data moving process S810, the decoding circuit 352, the decoding circuit 354, and the decoding circuit 356 are each simultaneously executing the decoding process S820.

In some embodiments, if the decompression module 350 does not include the parser 351, the data moving process S810 is executed by the computing circuit 320.

Reference is made to FIGS. 6-8 for the following discussion.

The data moving process S810 includes the following steps.

Step S811: The parser 351 or the computing circuit 320 performs a read operation to read the target sub-block from the storage device 303 through the storage control circuit 340. When step S811 is executed for the first time, the target sub-block is the sub-block immediately follows the header HDR, that is, the sub-block B1_CP1 (as shown in FIG. 6). In other words, the parser 351 or the computing circuit 320 first determines the start address of the sub-block B1_CP1 according to the header HDR (e.g., first deduces the size of the header HDR from the number of blocks NB, and then adds the address of the pre-identifier FID and the size of the header HDR to obtain the start address of the sub-block B1_CP1), and then performs a read operation (using the start address (addr1) of the sub-block B1_CP1 as the read address) to read the amount of data of the sub-block size SSB (i.e., to read the target sub-block) from the storage device 303 through the storage control circuit 340.

Step S812: The parser 351 or the computing circuit 320 performs a write operation to store the target sub-block to the target storage space in the memory 302 through the memory interface circuit 310. The target storage space corresponds to the block to which the target sub-block belongs.

Continuing the previous paragraph, the parser 351 or the computing circuit 320 first determines the block to which the target sub-block belongs according to the header HDR. As mentioned above, the parser 351 or the computing circuit 320 first obtains the number of sub-blocks (NSB1, NSB2, NSB3) of each block according to the header HDR, and then the parser 351 or the computing circuit 320 learns the distribution of the sub-blocks in the storage device 303 according to the number of blocks NB and the number of sub-blocks (NSB1, NSB2, NSB3). Therefore, the parser 351 or the computing circuit 320 can determine the block to which the target sub-block belongs according to the header HDR.

Continuing the previous paragraph, after knowing the block to which the target sub-block belongs, the parser 351 or the computing circuit 320 obtains the size of the block to which the target sub-block belongs (i.e., SCB1, SCB2, or SCB3) according to the header HDR and determines or locates the storage space in the memory 302 corresponding to the block (i.e., the storage space MB1, the storage space MB2, or the storage space MB3). Therefore, the parser 351 or the computing circuit 320 can determine the write address of the sub-block B1_CP1 in the memory 302 (which is addr2, that is, the start address of the storage space MB1), and then write the sub-block B1_CP1 to the write address. In other words, when the target sub-block is the sub-block B1_CP1, step S811 and step S812 correspond to the arrow A1 in FIG. 6 and FIG. 7.

Step S813: The parser 351 or the computing circuit 320 determines whether there are still sub-blocks to be processed according to the header HDR. If YES, the flow proceeds to step S814; if NO (i.e., for the examples in FIG. 6 and FIG. 7, the parser 351 or the computing circuit 320 has finished processing the last sub-block B2_CP5 in the storage device 303), then the process ends.

Step S814: The parser 351 or the computing circuit 320 uses a next sub-block immediately following the target sub-block as the target sub-block, and then the process returns to step S811. More specifically, step S814 updates the target sub-block to determine the read address of the read operation (i.e., step S811) and the write address of the write operation (i.e., step S812) in the next iteration. Continuing the previous example, since the current target sub-block is the sub-block B1_CP1, the next target sub-block is the sub-block B2_CP1; therefore, the new read address is the start address of the sub-block B2_CP1 (addr1+SSB), and the new write address is the start address of the storage space MB2 (addr2+4*SSB). The start address of the sub-block B2_CP1 (addr1+SSB) is equal to the start address of the sub-block B1_CP1 (addr1) plus the sub-block size SSB.

The parser 351 or the computing circuit 320 repeats the steps of the data moving process S810 to move more sub-blocks (i.e., to carry out the data movements corresponding to the arrow A2, the arrow A3, the arrow A4, ... in sequence). Note that the sub-block B1_CP1 and the sub-block B2_CP1 are next to each other in the storage device 303 but not next to each other in the memory 302; in other words, in the memory 302, the start address of the sub-block B2_CP1 (addr2+4*SSB) is not equal to the start address of the sub-block B1_CP1 (addr2) plus the sub-block size SSB.

Once the write of the sub-block B1_CP1, the sub-block B2_CP1, and the sub-block B3_CP1 to the memory 302 is started, the decoding circuit 352, the decoding circuit 354, and the decoding circuit 356 can start to read the sub-blocks from the storage space MB1, the storage space MB2, and the storage space MB3 and decode them, respectively, that is, executing the decoding process S820. The decoding circuit 352, the decoding circuit 354, and the decoding circuit 356 obtain the start addresses of the storage space MB1, the storage space MB2, and the storage space MB3 from the parser 351 or the computing circuit 320. The decoding process S820 includes the following steps.

Step S821: The $X^{th}$ decoding circuit reads the target sub-block from the $X^{th}$ storage space ($1 \leq X \leq NB$) of the memory 302. Taking FIG. 6 for example, the decoding circuit 352 (the decoding circuit 354 or the decoding circuit 356) reads the target sub-block from the storage space MB1 (the storage space MB2 or the storage space MB3).

Step S822: The $X^{th}$ decoding circuit decodes the target sub-block to obtain decoded data. More specifically, the decoding circuit 352 (the decoding circuit 354 or the decoding circuit 356) decodes the target sub-block and generates the decoded data (i.e., partial data of the block BLU, the block B2_U, and the block B3_U).

Step S823: The $X^{th}$ decoding circuit stores the decoded data in a storage space of the memory. Taking FIG. 6 for example, the decoding circuit 352 (the decoding circuit 354 or the decoding circuit 356) stores the decoded data in the storage space MB4 (the storage space MB5 or the storage space MB6). In some embodiments, the parser 351 or computing circuit 320 allocates the storage space MB4, the storage space MB5, and the storage space MB6 in the memory 302 (i.e., determines the addresses of the storage space MB4, the storage space MB5, and the storage space MB6 in the memory 302) according to the contents of the header HDR (i.e., the size of the first block after decompression SUB1, the size of the second block after decompression SUB2, and the size of the third block after decompression SUB3), and sends the start addresses of the storage space MB4, the storage space MB5, and the storage space MB6 to the decoding circuit 352, the decoding circuit 354, and the decoding circuit 356.

Step S824: The $X^{th}$ decoding circuit determines whether there are still sub-blocks to be processed. More specifically, the decoding circuit 352, the decoding circuit 354, and the decoding circuit 356 respectively check whether the sub-blocks in the storage space MB1, the storage space MB2, and the storage space MB3 have been processed. If YES, the flow proceeds to step S825; if NO (i.e., for the example in FIG. 6, the decoding circuit 352 (the decoding circuit 354 or the decoding circuit 356) has processed all the sub-blocks in the storage space MB1 (the storage space MB2 or the storage space MB3)), then the process ends.

Step S825: The $X^{th}$ decoding circuit uses a next sub-block immediately following the target sub-block as the target sub-block. In other words, as shown in FIG. 6 and FIG. 7, the decoding circuit 352 (the decoding circuit 354 or the decoding circuit 356) successively reads the sub-blocks in the storage space MB1 (the storage space MB2 or the storage space MB3). That is to say, in step S825, the $X^{th}$ decoding circuit generates a new read address by adding the sub-block size SSB to the current read address (which is used in step S821) and then performs step S821.

As discussed above, because the sizes of the blocks have been properly designed in advance (i.e., the flow in FIG. 4), the decoding circuit 352, the decoding circuit 354, and the decoding circuit 356 complete the decoding process S820 at similar or substantially the same time points (i.e., the decoding of the block B1_CP, the decoding of the block B2_CP, and the decoding of the block B3_CP are complete at similar or substantially the same time points, which is equivalent to a result that the storage space MB4, the storage space MB5, and the storage space MB6 are filled up at similar or substantially the same time points).

To sum up, in this invention, a block is divided into multiple sub-blocks; this enables multiple decoding circuits to decode simultaneously, thus improving the performance of the electronic device 301. Moreover, by carefully arranging the positions of the sub-blocks in the storage device 303 and the memory 302, the data can be read from consecutive addresses in the storage device 303 when the data moving process S810 is being executed, and the data can be read from consecutive addresses in the memory 302 when the decoding process S820 is being executed. In comparison with random access to data, reading data from consecutive addresses can increase the data reading speed.

The compressed data discussed above may be data generated based on the xz compression method. The xz compression method is well known to people having ordinary skill in the art, and the details are thus omitted for brevity.

The compressed data discussed above may be data (e.g., program codes or program instructions) that the electronic device 301 requires during operation. In some embodiments, the compressed data is a segment of the boot codes (executed by the computing circuit 320) of the electronic device 301. For example, the boot codes include Miniboot, U-boot, and Kernel, and the compressed data is the U-boot and the Kernel. After executing the ROM boot, the computing circuit 320 first executes the Miniboot to initiate the memory interface circuit 310, the storage control circuit 340, and the decompression module 350, and then executes the processes of FIG. 8 to decode the U-boot and the Kernel. The Miniboot, the U-boot, and the Kernel are well known to people having ordinary skill in the art, and the details are thus omitted for brevity.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An electronic device coupled to a storage device and a memory, the storage device storing a compressed data, the electronic device comprising:
   a memory interface circuit coupled to the memory;
   a decompression module comprising a first decoding circuit and a second decoding circuit; and
   a computing circuit;

wherein the decompression module or the computing circuit performs following steps:
(A) performing a first read operation to read a first sub-block from a first read address of the storage device;
(B) performing a first write operation to write the first sub-block to a first write address of the memory through the memory interface circuit;
(C) performing a second read operation to read a second sub-block from a second read address of the storage device, the second read address being equal to the first read address plus an amount of data of the first sub-block; and
(D) performing a second write operation to write the second sub-block to a second write address of the memory through the memory interface circuit;
wherein the decompression module performs following steps:
(E) reading, via the first decoding circuit, the first sub-block from the memory and decoding, via the first decoding circuit, the first sub-block; and
(F) reading, via the second decoding circuit, the second sub-block from the memory and decoding, via the second decoding circuit, the second sub-block;
wherein the compressed data comprises a first block and a second block, the first sub-block is a part of the first block, the second sub-block is a part of the second block, the first decoding circuit requires a first decompression time to decode the first block, the second decoding circuit requires a second decompression time to decode the second block, and sizes of the first block and the second block are adjusted wherein a ratio of the first decompression time to the second decompression time is less than or equal to 1.2.

2. The electronic device of claim 1, wherein the second write address is not equal to the first write address plus the amount of data of the first sub-block.

3. The electronic device of claim 1, wherein the storage device further stores an information file of the compressed data, and the decompression module or the computing circuit obtains the first read address and the second read address according to the information file.

4. The electronic device of claim 3, wherein the information file contains the amount of data of the first sub-block, and the decompression module or the computing circuit determines the second read address according to the first read address and the amount of data.

5. The electronic device of claim 3, wherein the decompression module or the computing circuit further performs following steps:
performing a third read operation to read a third sub-block from a third read address of the storage device, the third sub-block being a part of the first block, and the second read address being between the first read address and the third read address; and
performing a third write operation to write the third sub-block to a third write address of the memory through the memory interface circuit.

6. The electronic device of claim 5, wherein the third write address is equal to the first write address plus the amount of data of the first sub-block.

7. The electronic device of claim 1, wherein the computing circuit executes boot codes of the electronic device, and the compressed data is a segment of the boot codes.

8. The electronic device of claim 7, wherein the segment is a first segment of the boot codes, the computing circuit executes a second segment of the boot codes to initiate the memory interface circuit, and the decompression module or the computing circuit executes the step (A) to the step (F) after the memory interface circuit is initiated.

9. An operation method of an electronic device, wherein the electronic device comprises a first decoding circuit and a second decoding circuit, the electronic device is coupled to a storage device and a memory, and the storage device stores a compressed data, the method comprising:
performing a first read operation to read a first sub-block from a first read address of the storage device;
performing a first write operation to write the first sub-block to a first write address of the memory;
performing a second read operation to read a second sub-block from a second read address of the storage device, the second read address being equal to the first read address plus an amount of data of the first sub-block;
performing a second write operation to write the second sub-block to a second write address of the memory;
reading, via the first decoding circuit, the first sub-block from the memory and decoding, via the first decoding circuit, the first sub-block; and
reading, via the second decoding circuit, the second sub-block from the memory and decoding, via the second decoding circuit, the second sub-block;
wherein the compressed data comprises a first block and a second block, the first sub-block is a part of the first block, the second sub-block is a part of the second block, the first decoding circuit requires a first decompression time to decode the first block, the second decoding circuit requires a second decompression time to decode the second block, and sizes of the first block and the second block are adjusted wherein a ratio of the first decompression time to the second decompression time is less than or equal to 1.2.

10. The method of claim 9, wherein the second write address is not equal to the first write address plus the amount of data of the first sub-block.

11. The method of claim 9, wherein the storage device further stores an information file of the compressed data, the method further comprising:
reading the information file, and obtaining the first read address and the second read address according to the information file.

12. The method of claim 11, wherein the information file contains the amount of data of the first sub-block, the method further comprising:
determining the second read address according to the first read address and the amount of data.

13. The method of claim 11 further comprising:
performing a third read operation to read a third sub-block from a third read address of the storage device, the third sub-block being a part of the first block, and the second read address being between the first read address and the third read address; and
performing a third write operation to write the third sub-block to a third write address of the memory.

14. The method of claim 13, wherein the third write address is equal to the first write address plus the amount of data of the first sub-block.

15. An electronic device coupled to a storage device and a memory, wherein the storage device stores a compressed data, the electronic device comprising:
memory interface circuit coupled to the memory;
decompression module comprising a first decoding circuit and a second decoding circuit; and
a computing circuit;

wherein the decompression module or the computing circuit performs following steps:

reading a first sub-block of the compressed data from the storage device;

writing the first sub-block to a first storage space of the memory through the memory interface circuit;

reading a second sub-block of the compressed data from the storage device, the second sub-block immediately following the first sub-block in the storage device; and writing the second sub-block to a second storage space of the memory through the memory interface circuit, the second storage space being different from the first storage space;

wherein the decompression module performs following steps:

reading, via the first decoding circuit, the first sub-block from the first storage space and decoding, via the first decoding circuit, the first sub-block; and reading, via the second decoding circuit, the second sub-block from the second storage space and decoding, via the second decoding circuit, the second sub-block, wherein the compressed data comprises a first block and a second block, the first sub-block is a part of the first block, the second sub-block is a part of the second block, the first decoding circuit requires a first decompression time to decode the first block, the second decoding circuit requires a second decompression time to decode the second block, and sizes of the first block and the second block are adjusted wherein a ratio of the first decompression time to the second decompression time is less than or equal to 1.2.

16. The electronic device of claim 15, wherein the second sub-block does not immediately follow the first sub-block in the memory.

17. The electronic device of claim 15, wherein the storage device further stores an information file of the compressed data, and the decompression module or the computing circuit obtains an address of the first sub-block and an address of the second sub-block in the storage device according to the information file; the decompression module obtains a size of the first sub-block according to the information file, and the decompression module or the computing circuit determines the address of the second sub-block according to the address and the size of the first sub-block.

18. The electronic device of claim 17, wherein the compressed data comprises a first block and a second block, the first sub-block is a part of the first block, the second sub-block is a part of the second block, and the decompression module further performs following steps:

reading a third sub-block of the compressed data from the storage device, the third sub-block being a part of the first block, and the third sub-block not immediately following the first sub-block in the storage device; and writing the third sub-block to the first storage space of the memory through the memory interface circuit.

* * * * *